Feb. 15, 1944.   H. V. PACKER   2,341,808
LATHE DRIVE
Filed May 14, 1942   2 Sheets-Sheet 2

INVENTOR.
Harry V. Packer
BY Robert W. Wilson
ATTORNEY

Patented Feb. 15, 1944

2,341,808

UNITED STATES PATENT OFFICE 2,341,808

LATHE DRIVE

Harry V. Packer, East Cleveland, Ohio, assignor to The Oster Manufacturing Company, Cleveland, Ohio, a corporation of Ohio Application May 14, 1942, Serial No. 442,983

3 Claims. (Cl. 82—22)

This invention, which is in the field of lathes, has for its purpose the provision of an improved safety device for preventing the lead and the feed drive from being thrown into engagement at the same time. A further object of the invention is to furnish such a means which will be reliable and simple in operation, not subject to undue wear, having relatively few parts and those sturdy and simple, readily accessible for servicing, simple and relatively inexpensive to manufacture. Other advantages and results will appear from the following description of a preferred form of this invention, it being understood the description and illustrations of the invention as embodied in such form is not a limitation but a preferred example.

In the accompanying drawings of such preferred embodiment,

Figs. 4, 5 and 6 are reduced scale simplified diagrammatic illustrations corresponding generally to Fig. 1, showing various operating positions.

Figure 1:
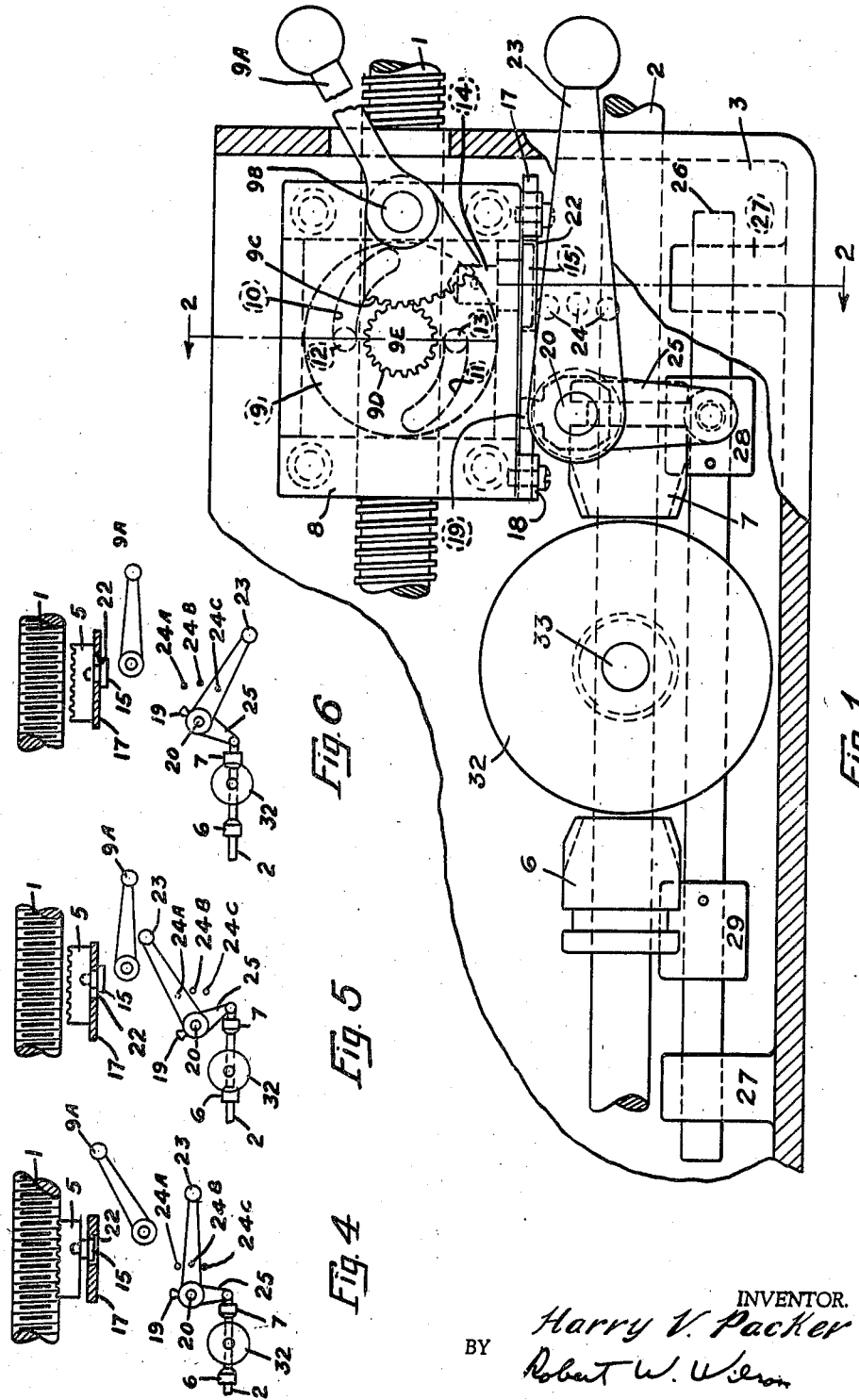
Fig. 1 is a front elevation of the invention as applied to the apron of a lathe, the cover being broken away.

In the figures a lead screw 1 and feed shaft 2 of a conventional engine lathe are shown in their relation to the lathe apron 3. The lead screw is engageable by the halves 4 and 5 of a separable nut, while two bevel pinions 6 and 7 are splined to the feed shaft, and the drive of the apron when not on the lead screw is from these gears. The general arrangement is conventional.

Figure 2:
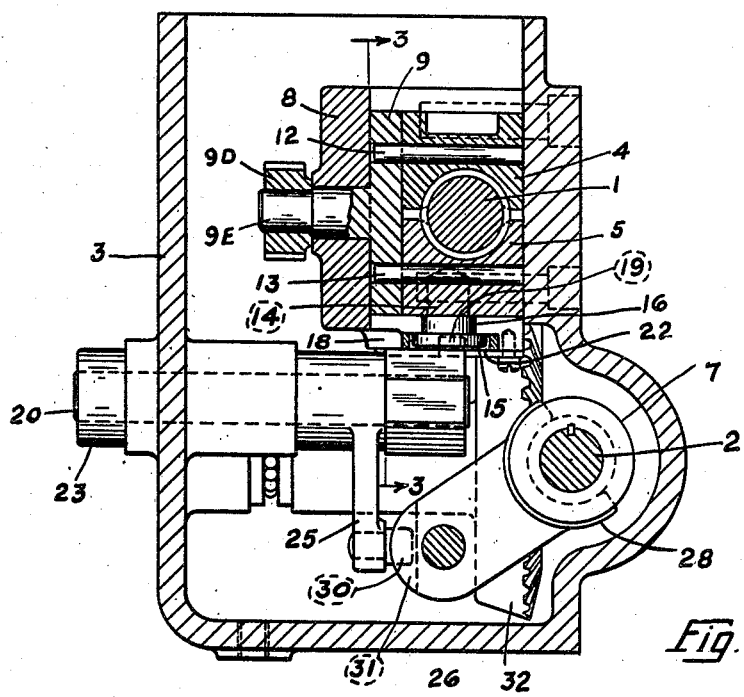
Fig. 2 is a transverse vertical section on the plane 2—2 of Fig. 1.
Figure 3:
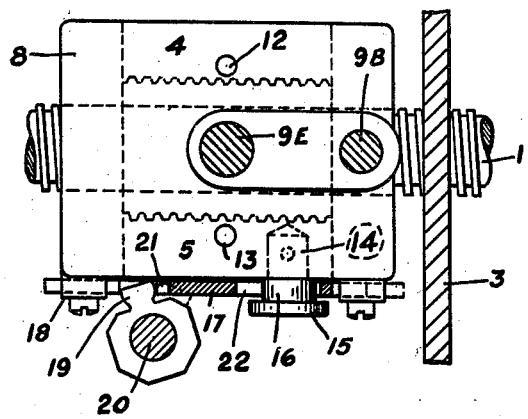
Fig. 3 is a longitudinal elevation of a detail, with some parts in section, the view being indicated by the arrows 3—3 and their line in Fig. 2.

The nut halves are moved vertically in a box 8 by a scroll plate 9 operated conventionally by handle 9A pivoted at 9B through gear segment 9C and pinion 9D on the scroll plate shaft 9E. The scroll plate has the usual cam slots 10 and 11 in which pins 12 and 13, fast to the nut halves 4 and 5, engage. A stud 14 with an enlarged head 15 is rigidly secured in the lower nut half 5, with a shank portion 16 exposed between the head and the bottom face of the nut half. A plate 17, a little less thick than the length of the exposed shank 16, is held against the bottom of nut half 5 by suitable guiding elements 18, and is slidable therealong for a short distance by suitable means such as a nose 19 on a control shaft 20, the nose engaging in a slot 21 in the plate 17. The head 15 is slightly smaller than a hole 22 in the plate 17 and thus overlaps the plate at either extreme of plate travel (Figs. 3, 5 and 6), thus positively preventing movement of the lower nut half 5 to engage the lead screw 1, but clears the hole edges and thus permits such engagement when the plate is in its mid position (Figs. 1, 2 and 4). Inasmuch as the nut halves 5 and 4 are positively connected through the scroll plate 9 and pins 12 and 13 the lock is positively effective for both nut halves.

The control shaft 20 is operated by a handle 23 fast thereto which can be held in any of three distinct positions by detents 24A, 24B and 24C, collectively indicated by reference character 24. A lever arm 25 dependent from and also fast to the shaft 20 shifts the gears 6 and 7 on the feed shaft 2 by conventional connections, shown in Fig. 1 as a horizontal rod 26 guided in lugs 27 in the housing of the apron 3 with forked bosses 28 and 29 fast upon the rod and engaging the respective gears. A roller 30 on the lower end of lever 25 rides in a slot 31 in the boss 28 thus communicating the movement of handle 23 to the shifting mechanism. One or other of the bevel pinions 6 and 7 can selectively engage a larger bevel gear 32 on a transverse shaft 33 from which the usual longitudinal and cross feeds are driven by suitable gear trains, clutches and other mechanism, none of which is shown.

Referring now to Figs. 4, 5 and 6, in which parts are separated for explanatory illustration, Fig. 4 shows the elements in position for the apron to be moved by the lead screw 1, Fig. 5 shows the parts in position for the apron to be traversed in one direction by power from the feed shaft 2, and Fig. 6 shows the parts in position for traverse in the opposite direction by power from the feed shaft. The position of parts in Fig. 4 is the same as that in Fig. 1, with handle 23 in neutral detent 24B, both bevel pinions out of engagement, the opening 22 in plate 17 in position to receive the stud head 15, the nut handle 9A up, and the nut halves 4 and 5 (the latter omitted from Figs. 4, 5 and 6 for simplicity) engaging the lead screw. In Fig. 5 the handle 23 is in the upper detent 24A, the plate 17 is in its full left position so that the right edge of the hole 22 catches the head 15, preventing closure of the nut halves, while the pinion 6 engages the bevel 32, thus transmitting power to the apron mechanism for movement in one direction. In Fig. 6 the handle 23 is in bottom detent 24C, the plate is at its extreme right position, the left edge of the hole 22 locks the nut halves open, and power for the apron is taken off the feed shaft at pinion 7, so that longitudinal feed will be in the direction opposite to that of Fig. 5.

It will be understood that while I have shown and described a preferred embodiment of my invention, that it can be applied in modified forms and arrangements, all coming within the scope of the appended claims.

I claim:

1. In a lathe having an apron, a lead screw and a feed shaft selectively connectable to operate said apron and feed mechanism in said apron adapted to take power from said feed shaft, two half nuts, means for closing same on the lead screw, a stud fast to one of said nut halves and having an exposed neck and an enlarged head on the outer end thereof, a plate in a plane between the nut body and the head and having an opening therein surrounding said stud and larger than said head, means for moving said plate to bring said opening into or out of registry with said head, guides constraining said nut and said plate to movement in directions mutually at right angles, and a connection between said plate-moving means and said feed mechanism whereby said feed mechanism is disengaged before said opening clears said head.

2. In a lathe having a plurality of feed mechanisms including a lead screw, a drive shaft, a nut having separable sections engageable with the lead screw, means for opening or closing said nut, a movable feed mechanism controlling member associated with said shaft, a control plate actuated by said controlling member, disposed adjacent the nut and having an opening, and a stud carried by a nut section projecting into said plate opening, said stud having an enlarged head which lies within the opening of the plate and restrains movement of the plate to hold the controlling member against movement when the said nut engages the screw, said stud projecting through the plate with the head clear of the plate when the nut is in open position, whereby movement of said controlling member shifts the opening out of registry with the head and locks the nut against closing movement.

3. In a lathe having a plurality of feed mechanisms including a lead screw, a drive shaft, a nut having separable sections engageable with the lead screw, means for opening or closing said nut, a feed mechanism controlling member associated with said shaft and movable in either direction from a neutral position, a control plate actuated by said controlling member, disposed parallel to the screw adjacent the nut and having an opening, and a stud carried by a nut section projecting into said plate opening, said stud having an enlarged head which lies within the opening of the plate and restrains movement of the plate to hold the controlling member in neutral position when the said nut engages the screw, said stud projecting through the plate with the head clear of the plate when the nut is in open position, whereby movement of said controlling member in either direction from a neutral position shifts the opening out of registry with the head and locks the nut against closing movement.

HARRY V. PACKER.